US012223818B2

(12) United States Patent
Johnson (10) Patent No.: US 12,223,818 B2
(45) Date of Patent: Feb. 11, 2025

(54) IMAGE-BASED EVALUATION OF BABY BODILY POSITION WITH ALERT

(71) Applicant: Gabriel Johnson, Nashville, TN (US)

(72) Inventor: Gabriel Johnson, Nashville, TN (US)

( * ) Notice: Subject to any disclaimer, the term of this patent is extended or adjusted under 35 U.S.C. 154(b) by 0 days.

(21) Appl. No.: 18/346,750

(22) Filed: Jul. 3, 2023

(65) Prior Publication Data

US 2024/0013644 A1 Jan. 11, 2024

Related U.S. Application Data

(60) Provisional application No. 63/358,526, filed on Jul. 6, 2022.

(51) Int. Cl.
| | |
|---|---|
| *G08B 21/02* | (2006.01) |
| *G06T 7/70* | (2017.01) |
| *G06V 10/82* | (2022.01) |
| *G06V 20/52* | (2022.01) |
| *G06V 40/10* | (2022.01) |
| *G08B 7/06* | (2006.01) |
| *H04N 7/18* | (2006.01) |

(52) U.S. Cl.
CPC ............ *G08B 21/0208* (2013.01); *G06T 7/70* (2017.01); *G06V 10/82* (2022.01); *G06V 20/52* (2022.01); *G06V 40/10* (2022.01); *G08B 7/06* (2013.01); *H04N 7/183* (2013.01); *G06T 2207/20081* (2013.01); *G06T 2207/20084* (2013.01); *G06T 2207/30196* (2013.01); *G06T 2207/30232* (2013.01)

(58) Field of Classification Search
CPC ........ G08B 21/0208; G08B 7/06; G06T 7/70; G06T 2207/20081; G06T 2207/20084; G06T 2207/30196; G06T 2207/30232; G06V 10/82; G06V 20/52; G06V 40/10; G06V 10/454; G06V 40/23; H04N 7/183
See application file for complete search history.

(56) References Cited

U.S. PATENT DOCUMENTS

| | | | | |
|---|---|---|---|---|
| 10,921,763 | B1 * | 2/2021 | Correnti | G05D 1/0011 |
| 11,138,856 | B1 * | 10/2021 | Bharati | G06V 40/20 |
| 2015/0288877 | A1 * | 10/2015 | Glazer | H04N 7/183 |
| | | | | 348/77 |
| 2019/0130720 | A1 * | 5/2019 | Lui | G06V 10/82 |
| 2019/0272724 | A1 * | 9/2019 | Greene | G08B 21/0205 |
| 2021/0358284 | A1 * | 11/2021 | Tseng | A61B 5/746 |

\* cited by examiner

*Primary Examiner* — An T Nguyen (57) ABSTRACT

A method to monitor a baby by evaluating live images through use of machine learning techniques. The bodily position of the baby is determined and a decision is made whether the position constitutes a potentially unsafe situation, such as a prone position correlated with Sudden Infant Death Syndrome events. In the event of an unsafe situation, an alarm is generated to alert the caretaker and allow a chance to intervene. This system is highly adaptable to user preferences by nature of allowing the user to select from a variety of image evaluation schemes.

20 Claims, 10 Drawing Sheets

IMAGE-BASED EVALUATION OF BABY BODILY POSITION WITH ALERT

CROSS-REFERENCE TO RELATED APPLICATIONS

This application claims the benefit of provisional patent application Ser. No. 63/358,526, filed 6 Jul. 2022 by the present inventor, which is incorporated by reference in its entirety.

PRIOR ART

The following is a tabulation of some prior art that presently appears relevant:

U.S. PATENTS

| Patent Number | Kind Code | Publication Date | Patentee |
| --- | --- | --- | --- |
| 10,643,081 | B2 | 2020 May 5 | Silberschatz |
| 11,138,856 | B1 | 2021 Oct. 5 | Bharati |
| 10,645,349 | B2 | 2023 Apr. 11 | Glazer |
| 10,565,846 | B2 | 2020 Feb. 18 | Lui |
| 11,257,246 | B2 | 2022 Feb. 22 | Tseng |
| 7,035,432 | B2 | 2006 Apr. 25 | Szuba |
| 5,914,660 | A | 1999 Jun. 22 | Mesibov |
| 2016/0292984 | A1 | Oct. 6, 2016 | Pradeep |

NONPATENT LITERATURE

*Nanit Breathing Wear Pajamas*. (accessed 2023-05-08). Retrieved from https://www.nanit.com/products/nanit-pajamas There are several existing inventions aimed at detecting safe or unsafe bodily positions of babies, particularly by evaluating images.

Silberschatz describes a system which uses a camera to detect the presence/absence and location within a sleeping area of a baby, detect motion attributed to breathing or other body motions, and receive input from other environmental sensors. The goal is to determine if any environmental conditions such as temperature, humidity, or sound level are apparently bothersome to the baby and then adjust the environment accordingly. However, it does not alert the user based on unsafe sleeping positions such as sleeping in a prone position.

Pradeep describes a system which attempts to determine whether the baby is sleeping in a prone or supine position. This system includes a camera which is used for determining the location of the baby within the sleeping area and providing a live view to the user, however the determination between prone or supine position is achieved through use of wearable sensors such as accelerometers, rotational vector sensors, gravity sensors, orientation sensors, etc. The camera is an optional component which can be left behind when traveling or sleeping in different places.

Szuba describes a camera-based system to alert a user when a baby is in a high-risk position like sleeping prone. This system identifies the baby's sleeping position by comparing the pixels of a monitoring image to the pixels of a collection of reference images to determine which matches most closely. The collection of reference images is a limited set of the possible bodily positions or bedsheet/clothing patterns, which could lead to a lot of mis-classified images.

Glazer describes a camera system using machine learning techniques to identify objects in a sleeping area. This system sends the images via a network to be processed on a remote device, which for some users could raise privacy concerns.

Tseng describes a camera system to alert a user of a baby's prone or supine position. It uses machine learning techniques to identify bodily features of the subject, and then uses rules-based methods to draws conclusions about the overall bodily position based on the spacial relationships between these bodily features or their presence/absence. This rules-based method is static and rigid, which could lead to different results for babies with different facial features such as eyes close together vs. eyes far apart. A more generalized machine learning model for the evaluation may not be as affected by individual anatomy.

Bharati describes a camera system using convolutional neural network (CNN) machine learning to detect a baby's prone/supine position and alert the user. It provides some flexibility in terms of its ability to adapt by retraining the model based on user feedback. In order for the local system to retrain the CNN, it will require significant processing power to train a model and significant memory to store a large dataset of images, which would contribute to a high cost for the system.

Lui describes a camera system using deep learning techniques which can alert the user to a prone position or face covered status. It relies on both the camera and input from a microphone to determine presence of the baby. With a well-trained model, I believe a microphone wouldn't add necessary value, and a microphone's sensitivity to other sources of noise give rise to possibilities of false readings or covering up the sound of a softly breathing baby. This system provides adaptability by being able to receive updated deep learning models from a server, however the user does not get a choice in which model to use.

Nanit company utilizes a camera to detect patterns printed on the clothing of babies. The pattern surrounds the baby and is not correlated with a prone or supine position. Rather, the camera detects movement of the pattern to identify breathing patterns.

Mesibov describes a system for identifying the prone or supine position of a baby by use of a sensor to measure a specific wavelength of radiation reflected from the baby's clothing, which correlates to the baby's position. It does not evaluate images.

I am of the opinion that a system with the ability to adapt to the guardian's preferences, the guardian's risk tolerance, and baby needs over time would be a significant advantage to any of these existing inventions. Some of these inventions that employ deep learning have the ability to adjust thresholds for confidence levels, or update the trained model, but they all perform using variations of their own single model.

BACKGROUND

Research shows that the risk of Sudden Infant Death Syndrome (SIDS) can be reduced when babies sleep in a supine position instead of a prone position. Although a baby may be initially put to sleep on their back, they may roll over by themselves and end up sleeping in a prone position. If the baby's caretaker observes this, the caretaker may be able to roll the baby onto its back again. However, if this happens and the caretaker is unaware (for example if the caretaker is sleeping) then the baby may continue to sleep in a prone position and be at a higher risk for SIDS for an extended period of time.

SUMMARY

This summary is provided to introduce concepts related to a system and method for monitoring a baby's bodily position and alerting a caretaker, also referred to as the user, if intervention may be needed to prevent the baby from remaining in an unsafe position.

The system includes an image sensor, such as a digital camera, which overlooks the sleeping area of a baby. This image sensor is controlled by the monitoring system to acquire digital images of the sleeping area at time intervals. Those images are then processed using machine learning techniques to identify the baby's bodily position. Based on that, a conclusion is then drawn about the baby's position. If the baby's position is not classified as a safe position, then the system alerts the user through an audible alarm and/or other means so that the user can reposition the baby into a safe position. The monitoring system includes communication interfaces between components of the system and external devices. The machine learning techniques used and the criteria for what is classified as safe are encompassed in what I refer to as a machine learning technique configuration. Multiple configurations may be stored on the monitoring system and the user may select which one the monitoring system should use. Additional configurations may be obtained from a remote system and transferred to the monitoring system for deployment.

In some embodiments, the components of the monitoring system are located in a single enclosure. While in other embodiments, the components may be spread among more than one enclosure. One advantage to using multiple enclosures is that it could enable the alarm components to be located close to the user, while the image sensor is located close to the baby.

Some embodiments include auxiliary lights, whether in the visible or non-visible spectrum, which are controllable by the monitoring system to compensate for varying levels of ambient light in the sleeping area. This aids in acquiring good images.

In some embodiments, the user provides input to the monitoring system using buttons and/or switches to make selections. In some embodiments, the user receives outputs from the monitoring system such as audible signals, indicator lights, or visual displays. Some embodiments provide a greater level of interface through use of a graphical user interface which is accessed by a device external to the monitoring system itself such as a computer or smartphone. This user interface can be used to do things like view images, make selections, edit settings, and load new machine learning technique configurations, and select which evaluation scheme is to be used.

Some embodiments make use of deep learning convolutional neural network (CNN) models as part of the machine learning technique configurations to process the images. These models have been trained on large datasets of images by a remote system and then the models are exported in a format usable by the monitoring system. These models are included as part of a machine learning technique configuration, which is in turn part of an evaluation scheme.

Some embodiments use a common deep learning technique called object detection to identify different classes of objects, their locations within the images, and corresponding confidence levels. One such embodiment identifies different classes of the baby's head position/rotation/orientation to determine a conclusion about the general body position of the baby.

One embodiment requires the baby to wear special clothes with distinct visible designs in one or more areas. One such embodiment includes four unique designs with one design on each of these four regions of the clothing: front, back, left side, right side. In one such embodiment, the evaluation scheme identifies occurrences of the unique designs within the images and uses that to determine which side of the baby is up and draw a conclusion about the baby's body position.

DETAILED DESCRIPTION

This description makes reference to some specific examples of the monitoring system for the purpose of providing an understanding of its components and function. While these descriptions are made in reference to certain embodiments, it is understood that this is not intended to limit the monitoring system to the described embodiments. Embodiments may include some or all of the described aspects, as well as alternatives within the scope defined in the claims. While some concepts are described in relation to certain embodiments, it is understood that these concepts are not limiting and may be used in conjunction with other embodiments. Some elements may be described in the singular or plural form for clarity, but are not meant to restrict the number of instances of the particular element. Some explanations describe entities being connected, however such connections may not necessarily mean a direct connection since connections are often facilitated by means of intermediary entities.

Many monitoring systems exist which allow a user to observe live images or video of a sleeping baby. However, many of these systems rely on the user actively observing the images in order to identify an unsafe sleeping position. When an unsafe position is observed, the user may intervene to correct the position. This is not ideal since a baby may be in an unsafe sleeping position while the user is not actively monitoring the images, which would delay intervention until the user observes the unsafe position. Some monitoring systems undertake the task of automatically identifying unsafe sleeping positions and notifying the user. This is more ideal because the alerted user may intervene sooner. Some of these monitoring systems employ techniques known commonly as machine learning, which evaluate images. Some of these systems employ machine learning techniques such as deep learning or use of convolutional neural networks. Deep learning models are trained on large datasets of diverse images and their corresponding annotations or classes. The resulting models can perform generalized evaluations of images, and their value lies in their ability to reliably evaluate images which were not part of the training set. Using a generalized deep learning model has advantages over a rules-based approach since deep learning models perform well on cases that fall outside of the original data used to develop the approach. Current baby monitoring system inventions that employ deep learning use a single convolutional neural network architecture, albeit that some systems allow customization through adjusting confidence level thresholds or through adding images to the dataset and retraining the model. The convolutional neural network architecture of such a system always provides outputs following the same structure specified in the neural network architecture. Additionally, no currently known inventions describe functionality allowing the user to specify different criteria having decision implications for a single classification. In my opinion, a more flexible and customizable approach to the model and decision-making criteria would be desirable. For example, in the case of a newborn baby, I may want to be alerted whenever the baby is in the "prone position with face down" or in the "prone position with face to the side". As the baby gets older or if my risk tolerance changes, I may decide that the "prone position with the face to the side" class is acceptable and does not require an alarm. Likewise, some parents may or may not want the model to identify other classes such as "hand covering face". Adding a different class to a convolutional neural network model would require changing the model architecture and then retraining the model. A single neural network architecture or rigid decision-making criteria does not allow the flexibility that I would find valuable.

Figure 7:
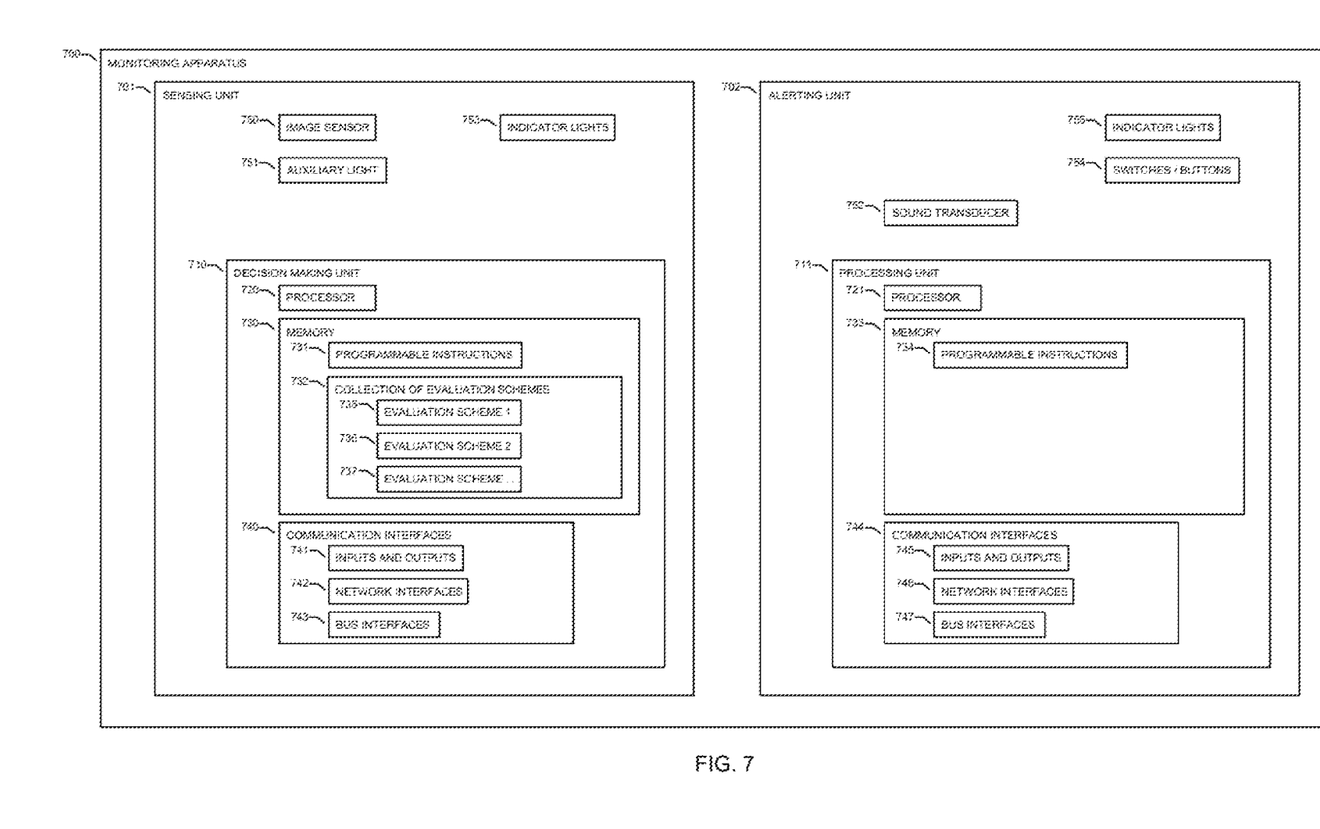
FIG. 7 illustrates internal components of a monitor within two housings
Figure 9:
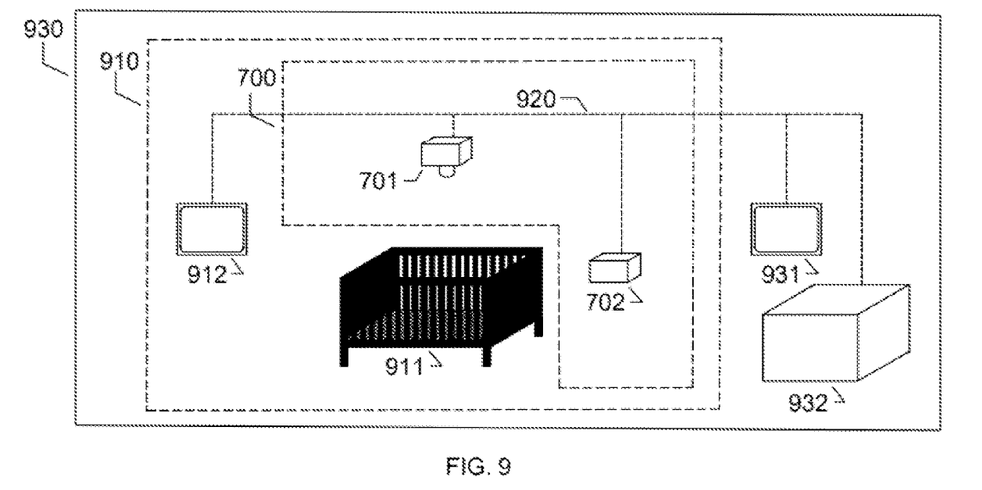
FIG. 9 is a general layout to illustrate spatial relationships and interconnections between major elements for the monitor shown in FIG. 7

I will now describe one embodiment of the monitoring system which is illustrated in detail 930 of FIG. 9. The monitoring apparatus 700 consists of the sensing unit 701 and the alerting unit 702. The sensing unit 701 contains an image sensor 750 as shown in FIG. 7, which is capable of acquiring digital images of the sleeping area 911 shown in FIG. 9. The alerting unit 702 contains a sound transducer 752 as shown in FIG. 7, which is capable of making a sound to alert a user when the baby is in a potentially unsafe position. The sensing unit 701 and the alerting unit 702 are connected via a communications pathway 920 so that information can be exchanged between them, thus enabling them to work together to acquire an image and then alert a user if the image shows a potentially unsafe situation. As shown in FIG. 9, the sensing unit 701 is mounted in such a way that it overlooks the sleeping area 911 of the baby, so that the sleeping area 911 is within the sensing range/field of view of the image sensor 750.

In the present embodiment, the sensing unit 701 shown in FIG. 7 includes an image sensor 750. One example of such an image sensor is a digital camera which can sense both visible and infrared light. There are many options for image sensors 750 that fit within this embodiment. One possible example of a digital camera is a Raspberry Pi Camera Module 3 NoIR, which is also capable of adjusting focus. Digital cameras may detect visible and/or non-visible light, and they may or may not have an IR-cut. Image sensors 750 may include strictly infrared cameras or other types of imaging sensors. Image sensors 750 are capable of acquiring images over a variable amount of time, which can be accomplished by adjusting the exposure time in the case of a global shutter, or the sampling time in the case of a rolling shutter. In the present embodiment, the sensing unit 701 also includes an auxiliary light 751, which is capable of illuminating the sleeping area 911. This auxiliary light 751 may incorporate visible and/or infrared light. The ability to acquire images over a variable amount of time and the ability to further illuminate the sleeping area with additional light helps to compensate for different levels of light in the sleeping area 911, which helps in obtaining a good image. Other embodiments may not include an auxiliary light 751.

In the present embodiment, the sensing unit 701 includes a decision-making unit 710 which further includes a number of sub-components. This decision-making unit 710 includes one or more processors 720, memory 730, and one or more communication interfaces 740. A Raspberry Pi single board computer is one example of a component which can be used as a decision-making unit 710. The memory 730 may include both volatile and non-volatile memory. Non-volatile memory may be on removable and/or non-removable media. The non-volatile memory stores programmable instructions 731 which are executed by the processor(s) 720. The non-volatile memory also includes memory for a collection of evaluation schemes 732, each of which contains configurations dictating the way images are processed and evaluated. These schemes will be explained in more detail later. Multiple evaluation schemes can be stored in the unit's memory 730. The number of evaluation schemes stored in the memory is not a fixed amount, but for this embodiment it includes three shown by details 735, 736, and 737 of FIG. 7. In this embodiment, the sensing unit 701 includes communication interfaces 740. These communication interfaces 740 allow the processor 720 communicate with elements of the monitoring apparatus itself as well as communicate with external devices. Interfaces for inputs and outputs 741 allow the processor to communicate via discrete I/O such as detecting inputs from buttons or switches and controlling outputs such as indicator lights 753 (to give feedback to the user). Inputs and outputs 741 may also include analog I/O for detecting input voltage from components such as variable resistor dials or controlling output voltage for components like auxiliary lights 751. Pulse width modulation may also be used for controlling outputs. Bus interfaces 743 may be used to enable the processor to communicate with various elements. A number of bus protocols may be used and a few examples are I2C (like for communicating with a digital camera), SPI, a variety of serial protocols (including USB), and others. Network interfaces 742 may be used to enable the processor to communicate with various elements or devices. A number of network protocols may be used and a few examples are TCP/IP, HTTP, UDP, FTP, and others. Communication may be enabled via many different methods such as hard-wiring, ethernet, Bluetooth, wife, cellular, and others. No embodiments are limited by the number or combinations of communication interfaces 740, and are further not limited in the specific types of communications utilized by each interface.

In the present embodiment as shown in FIG. 7., the alerting unit 702 includes many of the same types of components as the sensing unit 701, such as processor(s) 721, memory 733 with programmable instructions 734, and communication interfaces 744. The alerting unit also includes indicator lights 755 which give visual feedback to the user, communicating details from the processor(s) 721 such as the status or operational state of the monitoring apparatus 700, via the inputs and outputs 745 communication interface 744. Likewise, a sound transducer 752 is included which allows the processor to output an audible alarm sound to alert the user of a potentially unsafe condition. It includes switches/buttons 754, which are used to receive input from the user via the inputs and outputs 745 communication interface 744. Part of the value in having the sensing unit 701 and the alerting unit 702 in separate housings is that they can be located in two separate locations. The sensing unit 701 with the imaging sensor is located overlooking the sleeping area, while the alerting unit 702 can be located somewhere convenient to the user. This will allow the user to more easily access the switches/buttons 754 and observe the indicator lights 755. If the alerting unit 702 is located away from the baby, then there is less chance that the audible alarm will wake the baby. Repositioning the baby is generally easier if the baby is still asleep. As shown in FIG. 9, the sensing unit 701 and alerting unit 702 communicate with each other through a communications pathway 920 by use of their communications interfaces 740 744, for example via their network interfaces 742 746 or bus interfaces 743 747. One example of a communications pathway 920 is a local wireless network such one using wife technology. There are other communications pathways 920 available, and neither this embodiment nor any other embodiment are limited to use of a wireless network.

In FIG. 9, detail 910 shows the local elements of the monitoring system plus the sleeping area 911. These local elements in 910 may all be located withing the same dwelling (house, apartment, etc.), for instance. However, the proximity or location of these elements are not limited by this embodiment or any other embodiment.

In the present embodiment, a user may access a graphical user interface, which will allow them to observe images and other status information about the system. It will also allow them to edit settings. As shown in FIG. 9, this graphical user interface may be accessed by an external user device 912 931 which is capable of communicating with the monitoring apparatus 700 by way of a communications pathway 920. The external user device 912 931 is a device that is separate from the monitoring apparatus 700. External user devices 912 931 may be devices such as personal computer or smartphone. These external devices execute a software application to enable access to the graphical user interface. This software application can take many forms such as an application exchanging information in a client/server or publish/subscribe manner to transfer information and update its displays, or such as an application providing access to a graphical user interface hosted on the monitoring apparatus 700 such as in the case of a web server, or as any other form that offers functionality to access a graphical user interface. In the present embodiment, FIG. 9 shows an external user device on a local network 912, and an external user device on a remote network 931. No embodiments are meant to be limited to the number, type, connection method, or functioning method of these external user devices 912 931.

FIG. 9 shows a separate configuration system 932 for configuring evaluation schemes 1000. In the present embodiment, evaluation schemes 1000 are configured on this separate configuration system 932 and then may be transferred to the memory 730 of the decision-making unit 710, where they are stored in the memory allocated for evaluation schemes 732. In the present embodiment, FIG. 9 shows a communications pathway 920 between the monitoring apparatus 700 and the separate configuration system 932, which can facilitate the transfer of the evaluation scheme. Other embodiments may facilitate this transfer through the use of removable memory media. In the present embodiment, FIG. 7 shows that the memory 730 may store multiple evaluation schemes 732. The user may specify which of the evaluation schemes 732 should be used in processing and evaluating the images taken by the image sensor 750. All embodiments feature the ability of the user to specify which evaluation scheme should be used in the processing and evaluation of images. The user may specify a selection using the graphical user interface. Other embodiments enable the user to make the selection using switches/buttons 754, or other physical input components. In some embodiments, an unspecified number of evaluation schemes come pre-loaded in the memory 730. In some embodiments, one of the evaluation schemes is selected by default. The ability to add new evaluation schemes 732 to the memory 730, along with the ability to select which of the evaluation schemes 732 to use, gives great flexibility for the system to cater to the desires of the user. It provides an advantage not found in other inventions.

The present embodiment describes the monitoring apparatus 700 split between two housings as shown in FIG. 7 and FIG. 9, namely a sensing unit 701 and an alerting unit 702. The present embodiment also describes which elements are included in each of these housings. Other embodiments exist in which the specific components of the monitoring apparatus 700 are allocated differently between the two units. Further embodiments exist where there may be more than one alerting unit 702.

Figure 6:
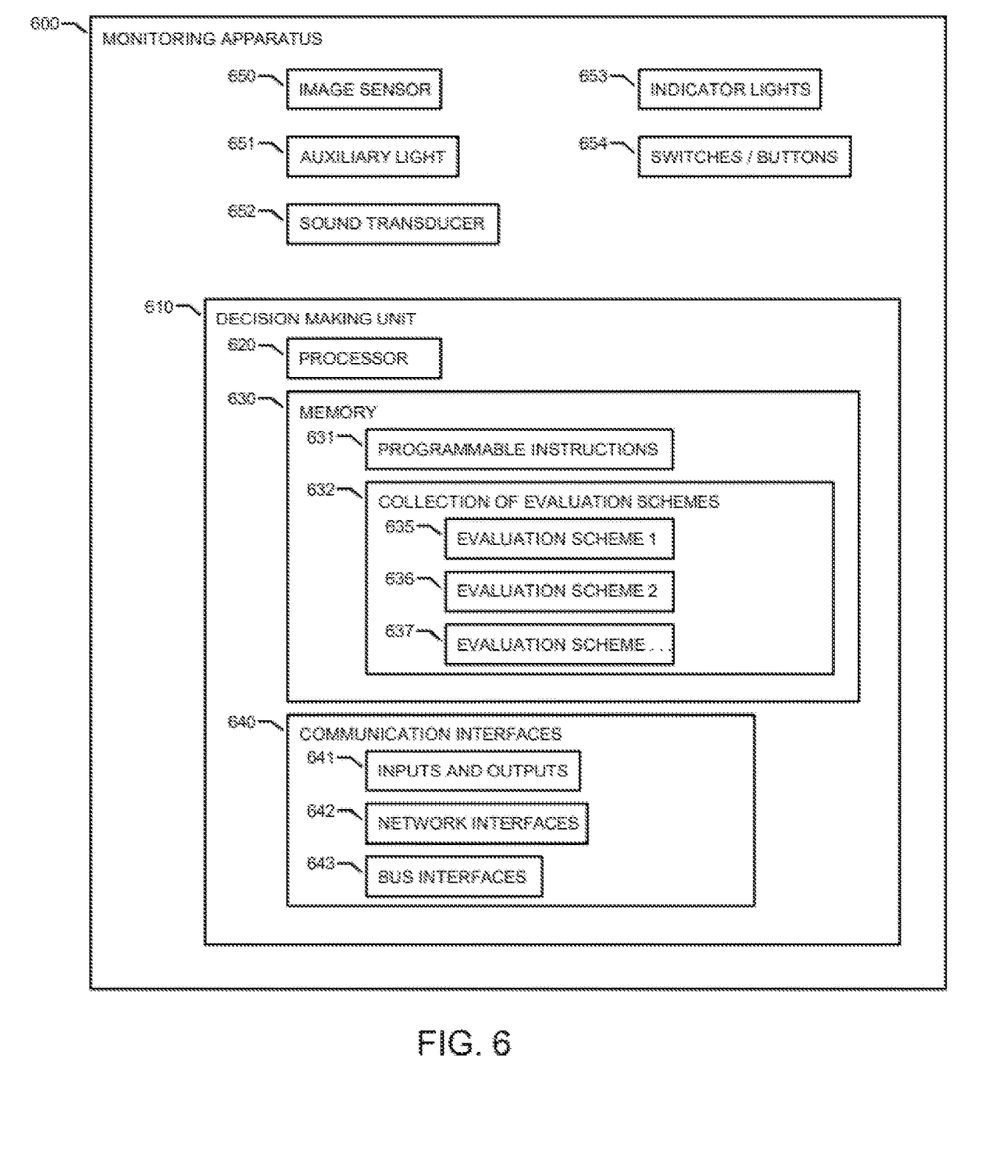
FIG. 6 illustrates internal components of a monitor within a single housing
Figure 8:
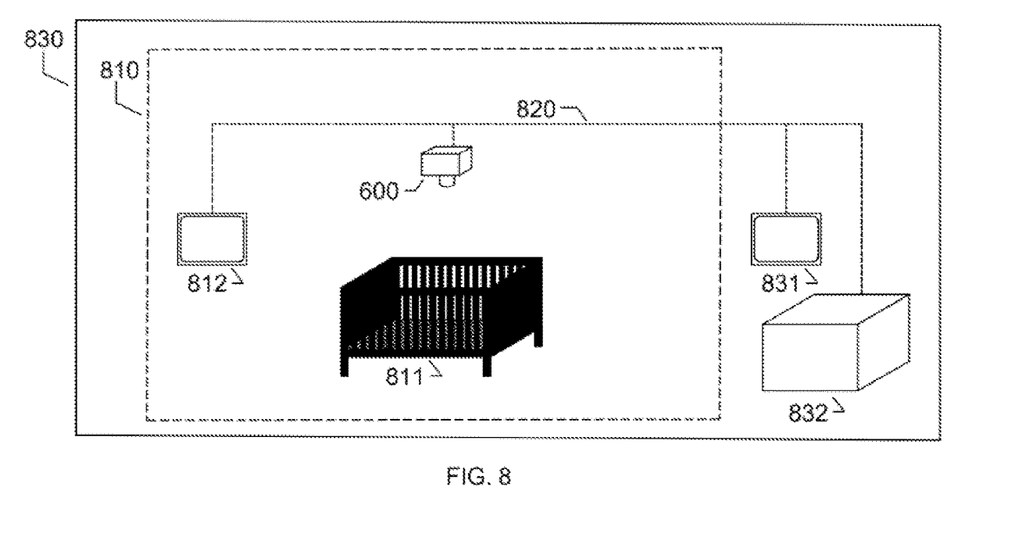
FIG. 8 is a general layout to illustrate spatial relationships and interconnections between major elements for the monitor shown in FIG. 6

Further embodiments exist, such as illustrated in FIG. 6 and FIG. 8, circumscribed in detail 830, where the entire monitoring apparatus 600 is contained in a single housing. Many of the elements of such embodiments are similar to those included in the present embodiment. Further embodiments such as those utilizing a single housing may include elements such as an image sensor 650, auxiliary light 651, sound transducer 652, indicator lights 653, switches/buttons 654, and decision-making unit 610. The decision-making unit 610 of further embodiments utilizing a single housing contains elements including processor(s) 620, memory 630 including programmable instructions 631 as well as a collection of evaluation schemes 632 that may include a variety of evaluation schemes 635 636 637, and may include communications interface 640 elements including those such as inputs and outputs 641, network interface 642, and bus interfaces 643. An embodiment where the entire monitoring apparatus 600 is contained in a single housing would still overlook a sleeping area 811. In an embodiment such as this utilizing a single housing, the local elements of the system plus the sleeping area shown in detail 810 may include a communications pathway 820 connecting the monitoring apparatus 600 to other devices such as user devices within the local area 812, remote user devices 831, and a separate configuration system 832.

Figure 10:
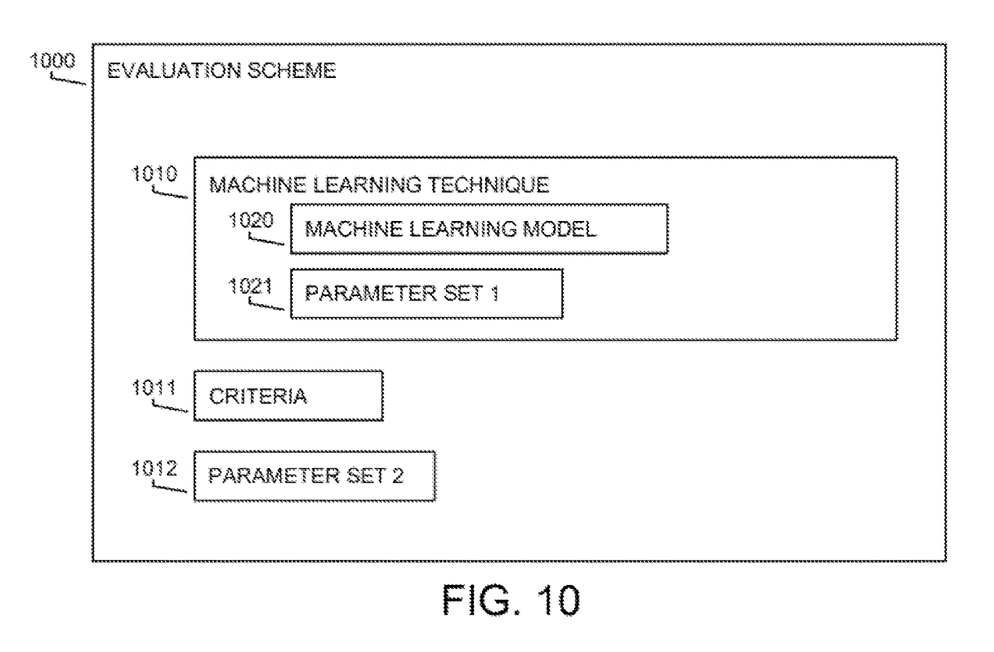
FIG. 10 illustrates the generalized makeup of an evaluation scheme employed by the monitoring system

In the present embodiment, as shown in FIG. 10, each evaluation scheme 1000 is configured to include a machine learning technique configuration 1010, criteria 1011, and parameters 1012. Each evaluation scheme 1000 is in the form of computer files. The machine learning technique configuration 1010 includes a machine learning model 1020 and associated parameters 1021. In the present embodiment, this machine learning model 1020 is a convolutional neural network (CNN) model, but other embodiments may use other types of models. CNN models are a common type of machine learning model used to evaluate images. Each CNN model is based on a predefined model architecture. Each model is trained by a computer using a large dataset of annotated or classified images. The performance of a particular model is dependent upon its architecture and upon the dataset on which it was trained. Model accuracy can be improved by making improvements to the dataset and re-training the model. When an image is evaluated using a CNN model, the model output is formatted in a way specified by the model architecture. If the categories of possible image classification needs to include more/less/different classes, then the model architecture must change, and the model must be re-trained based on the new architecture. When put to use, an evaluation scheme 1000 processes an image using a CNN machine learning model 1020 with relation to specific parameters 1021. Then the output of that processing is used in conjunction with specific parameters 1012 and judgment criteria 1011 to determine a conclusion about the position and orientation of the baby in the image. Training a CNN model is very resource intensive from a computer requirement standpoint. It requires memory to hold large datasets of images as well as powerful processors capable of performing the training Trained CNN models can be exported in the form of computer files and then referenced when performing image evaluation. This allows the models to be trained on a powerful computer and then deployed on a system having a less powerful processor. For example, TensorFlow is a commonly used machine learning platform which can be used by a powerful computer to create the architecture of a CNN model and train it on a dataset of images. A computer with limited resources such as a Raspberry Pi is not suitable for training CNN models or even processing an image using a standard pre-trained CNN model. TensorFlow includes functionality to convert a CNN model to what is called a TFLite CNN model, which is specifically meant for computers with limited resources such as a Raspberry Pi. It is desirable to deploy CNN models on a system with limited resources because such a system is less expensive than a system with extensive resources. In the present embodiment, the separate configuration system 932 shown in FIG. 9 is a system with extensive resources which is capable of creating and training CNN models. The monitoring apparatus 700 is a system with limited resources which may not be capable of creating and training CNN models, but it is capable of processing images using pre-trained CNN models which have been exported and saved in its memory 730. CNN models that have been pre-trained on the separate configuration system 932 are then paired with appropriate parameters 1021 as part of a machine learning technique 1010, which is then paired with appropriate judgment criteria 1011 and parameters 1012 to create an evaluation scheme 1000. Evaluation schemes 1000 can be transferred to the memory 730 of the monitoring apparatus 700, where they can be deployed by the monitoring apparatus 700. A specific evaluation scheme 1000, chosen from the collection of evaluation schemes 732, is chosen by the user and can be specified through a user interface such as an external user device 912 931. An advantage of having multiple evaluation schemes 1000 to choose from is that each evaluation scheme 1000 can contain different machine learning models 1020 with different model architectures. Another advantage of having multiple evaluation schemes 1000 to choose from is that each evaluation scheme 1000 can contain different judgment criteria 1011 which can influence how the body position is ultimately categorized in terms of being safe or unsafe. Other embodiments may include various types of machine learning models in addition to CNN models. No embodiment limits the number of evaluation schemes 1000 that may be included in the collection of evaluation schemes 732.

Figure 1:
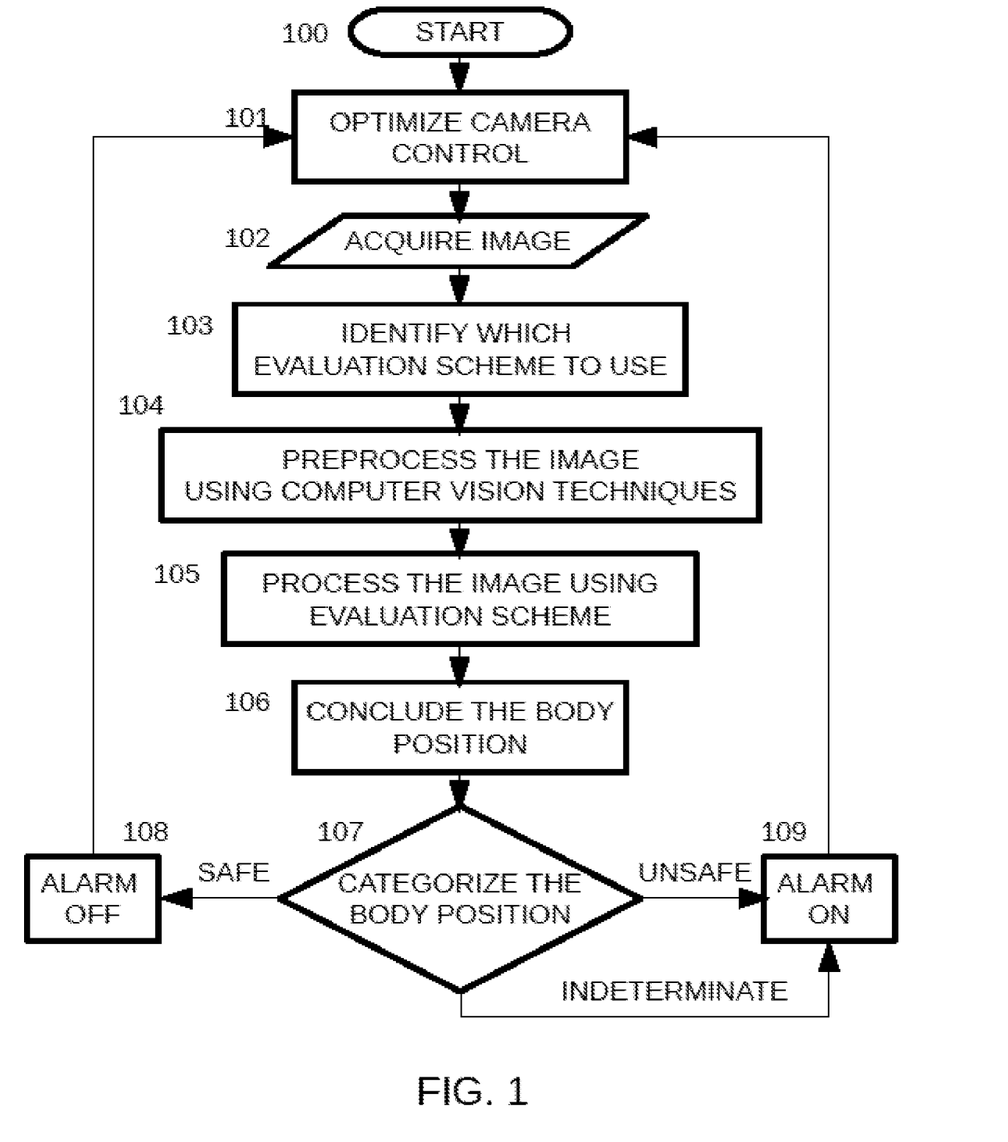
FIG. 1 is a high-level flowchart illustrating the general steps of continuous monitoring

I will now describe FIG. 1 which is a high-level flowchart illustrating the general steps of continuous monitoring in the present embodiment. When the system starts 100 its monitoring activity, it will first optimize camera control 101. The quality of the acquired image may be optimized in a number of ways including, but not limited to, adjusting the exposure time or sampling time of the image sensor 750, adding a degree of additional illumination using an auxiliary light 751, or adjusting settings of the image sensor 750 such as gain. Some embodiments may utilize a separate sensor to detect ambient light intensity in the sleeping area and communicate this to the processor via an input communication interface 740. Some embodiments may utilize the image sensor 750 itself to detect ambient light intensity. Once the ambient light intensity is detected, the processor can control the acquisition settings accordingly in order to obtain an image which is not over exposed or under exposed. Then the image sensor 750 acquires an image 102 and stores it in memory 730.

The system then identifies which evaluation scheme to use 103. The evaluation scheme is identified based on settings configured by the user. These settings are configured through use of a user interface. If the user has not specified an evaluation scheme from the collection of evaluation schemes 732, then a default selection may be used. The evaluation scheme that is selected remains selected until the user changes the selection. The identified evaluation scheme 1000 will contain parameters that are used by the processor 720 to direct the system's evaluation. The image which has just been acquired is then preprocessed using computer vision techniques 104. These techniques can include image enhancement techniques such as contrast equalization or color adjustments. These techniques can also include actions necessary to prepare the image to be fed into the CNN machine learning model 1020, which may include actions such as cropping or resizing. The image is then processed using the identified evaluation scheme 105. The output of the CNN model gives information such as confidence levels of the different classes accounted for in the model architecture. Based on the output of the machine learning model 1020, and according to parameters 1012 of the evaluation scheme, the system is able to conclude the body position 106 of the baby. Then based on that conclusion and the judgment criteria 1011, the system categorizes the body position 107 as either safe, unsafe, or indeterminate. If the baby's position is unsafe or indeterminate, the alarm is turned on 109. This alarm is in the form of a sound transducer 752 and/or message notification to a external user device 912 931. The process will then repeat starting at the optimize camera control 101 step. If the baby's body position is categorized as safe, then the system will cause any active alarm to be turned off 108. The process will then repeat starting at the optimize camera control 101 step. The system will continue to operate according to this flowchart as long as the system execution remains enabled by the user through a user interface such as a external user device 912 931 or through a user interface such as switches/buttons 754.

Figure 2:
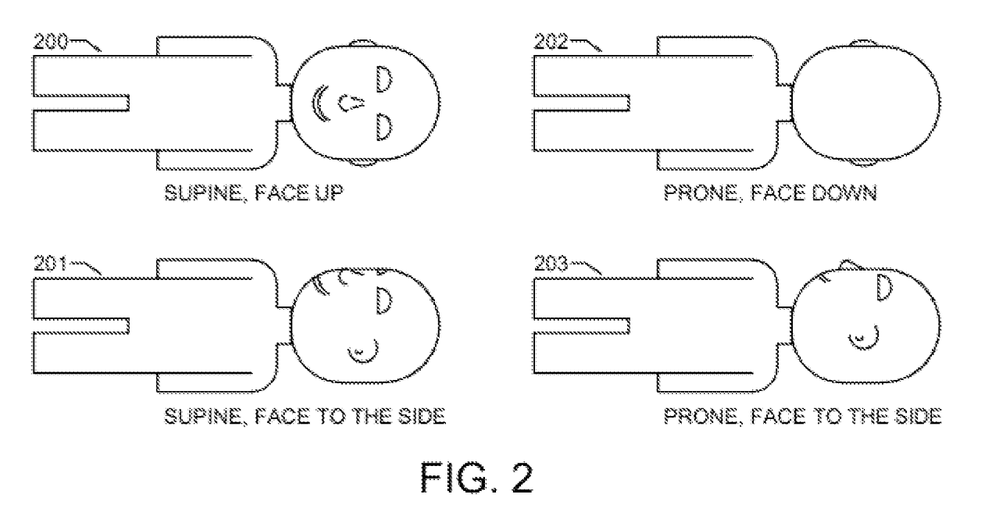
FIG. 2 illustrates some basic categories of a baby's head position
Figure 3:
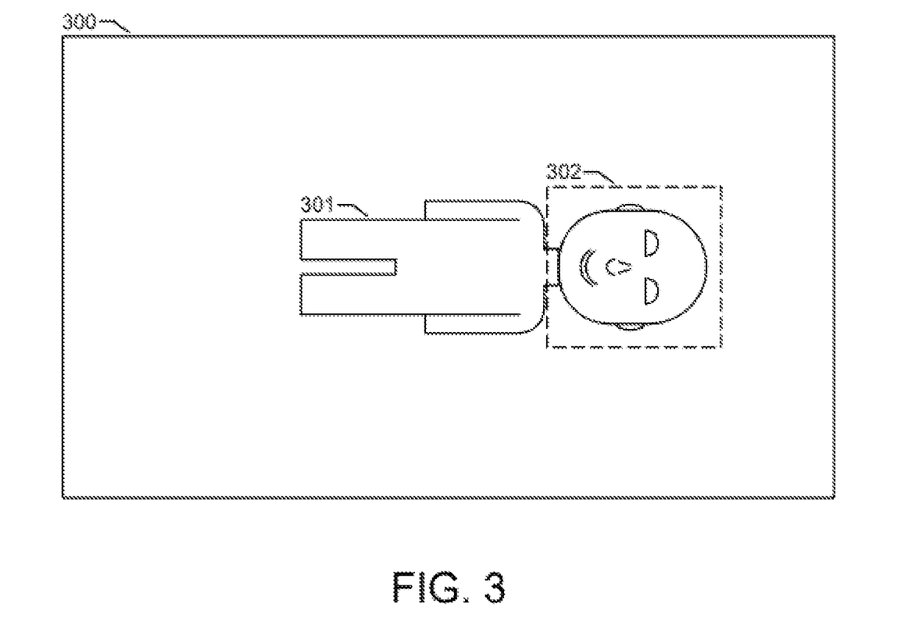
FIG. 3 illustrates a region of an image containing a baby's head

I will now describe image evaluation by some example CNN machine learning models in more detail. In the present embodiment, we will say that Evaluation Scheme 1 735 makes use of a common CNN machine learning technique known as object detection. In the output of an object detection model, objects and their locations are detected within an image, and a confidence level is given for each possible class included in the model's architecture. A class which is given a much higher confidence level than any other class is generally assumed to represent the category of the detected object. However, if no class is given a substantial confidence level above a threshold as specified in the evaluation scheme 1000 parameters 1012, then the system may not assume that the object reliably represents one of the categories of detectable objects accounted for in the model architecture. FIG. 3 illustrates a possible image evaluated using a machine learning technique configuration 1010. The baby 301 is located within the sleeping area 300. The region of the image identified as containing a head is noted by detail 302. The object detection CNN model will be used to determine what class best represents this region of interest identified as containing a head 302. When the CNN model was trained for Evaluation Scheme 1 735, it was trained on a dataset of images of babies 301 within a sleeping area 300. The images in this dataset include babies in many possible orientations, each of which can be described as belonging to one of the four classes of general body positions shown in FIG. 2, namely supine with face up 200, supine with face to the side 201, prone with face down 202, or prone with face to the side 203. Images in the training set were annotated with location information of the heads and labeled according to their class. Once the image is processed using the CNN model 105, and the body position concluded 106, the system will categorize the body position 107 based on judgment criteria 1011 to determine if the baby's body position is safe, unsafe, or indeterminate. Based on the judgment criteria 1011 of our example Evaluation Scheme 1 735, body positions of supine with face up 200 and supine with face to the side 201 are considered safe, while body positions of prone with face down 202 and prone with face to the side 203 are considered unsafe and would result in an alarm being activated 109.

In the present embodiment, we will consider an example where Evaluation Scheme 2 736 is similar to Evaluation Scheme 1 735, except that the judgment criteria 1011 is different. In Evaluation Scheme 2 736, a body position of supine with face up 200 or supine with face to the side 201 or prone with face to the side 203 are considered safe, while only prone with face down 202 is considered unsafe and would result in an alarm being activated 109.

As an example, the user may choose to select Evaluation Scheme 1 735 to run on the system when the baby is very young. As the baby gets older and less susceptible to SIDS, or if the risk tolerance of the user changes, then the user may instead choose to select Evaluation Scheme 2 736 to be used for the image evaluation.

Figure 4:
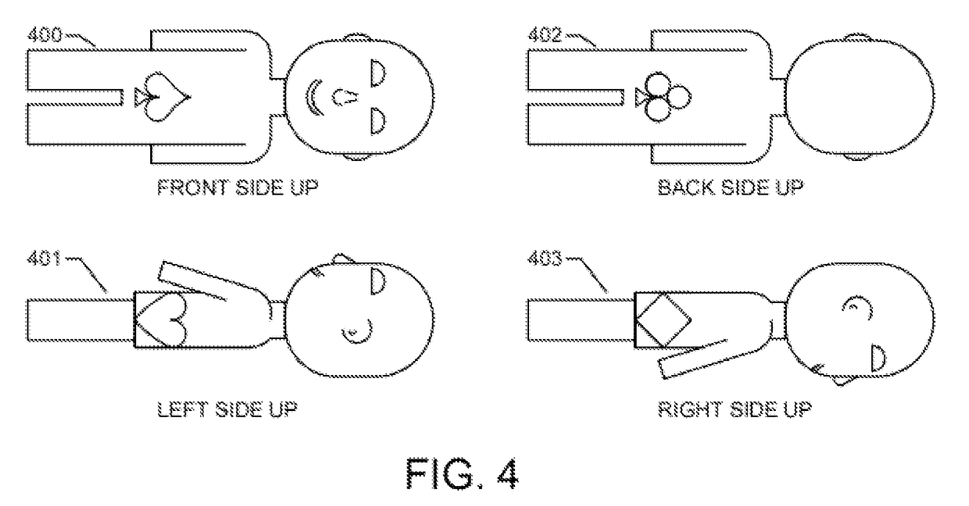
FIG. 4 illustrates clothing with distinct designs visible from different body orientations
Figure 5:
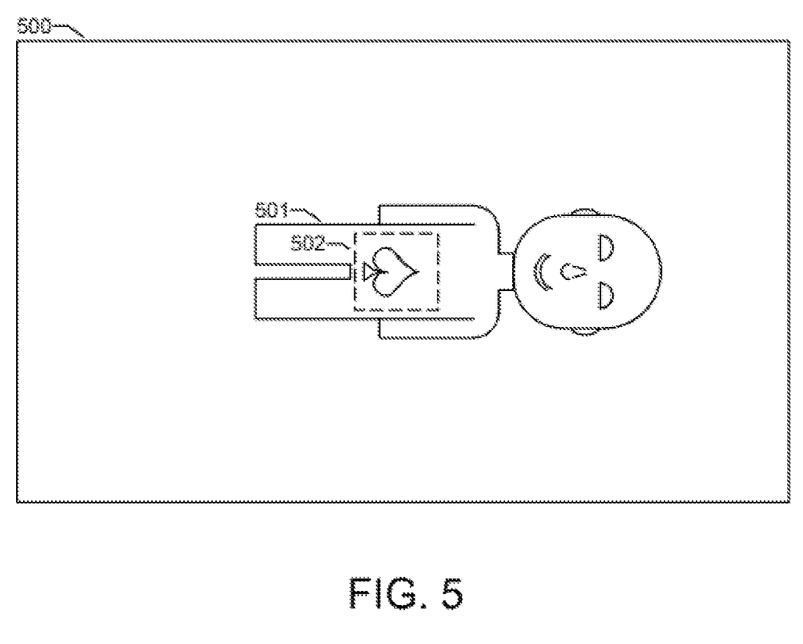
FIG. 5 illustrates a region of an image containing a distinct visible design on clothing

In the present embodiment, we will consider an example where Evaluation Scheme 3 737 is based on a CNN machine learning model 1020 performing object detection. The architecture of the CNN machine learning model 1020 of Evaluation Scheme 3 737 is different than that of the CNN machine learning model 1020 of Evaluation Scheme 1 735 or Evaluation Scheme 2 736. The CNN machine learning model 1020 of Evaluation Scheme 3 737 was trained on images of babies wearing a specific type of clothing. FIG. 4 illustrates an example of this specific type of clothing. This specific type of clothing has a unique distinctly visible design incorporated on each of its four sides. One of the four distinctly visible designs is primarily visible in each one of the four general body positions shown in FIG. 4, namely front side up 400, left side up 401, back side up 402, and right side up 403. Each of these four unique designs is a different class in the model architecture. When executed, the CNN machine learning model 1020 of Evaluation Scheme 3 737, identifies objects as shown in the example of FIG. 5 where the region of the image identified as containing one of the distinct designs 502 is identified within the sleeping area 500. The class of the detected object on a baby 501 can then be correlated with one of the four general body positions shown in FIG. 4. Based on the judgment criteria 1011 of Evaluation Scheme 3 737, a class correlating with front side up 400 position is considered safe, while classes correlating to left side up 401 or back side up 402 or right side up 403 are considered unsafe and would result in an alarm being activated 109.

It is important to note that CNN machine learning models are powerful in their ability to reliably perform on images that were not part of the training set. This means that babies with different facial features than those included in the training set can still benefit from the performance of a trained model. Likewise, untrained body positions of various highly specific angular orientations and head rotations can still be identified by a trained model even if that exact highly specific orientation or rotation was not included in the training dataset. Likewise, distinct designs on articles of clothing that are partially obscured by a baby's arm may still be identified.

The example evaluation schemes 1000 described in the present embodiment are meant to be examples and are not meant to limit the scope of possible evaluation scheme configurations. For example, other CNN techniques besides object detection may be used such as whole image classification. Other embodiments may use different types of machine learning models 1020, different judgement criteria 1011, and different parameters 1012 1021. The example as described in Evaluation Scheme 3 757 of identifying unique visible designs as illustrated in FIG. 4 does not limit various embodiments to any specific designs, positions of those designs on the clothing, number of distinct designs used, or which sides those designs may or may not be incorporated on. For example, other embodiments may only use one visible design on the front of the clothing, and further embodiments may include that design being visible only from the front only or from the front and partially visible from the sides. There are too many variations to mention here, all of which may be circumscribed within the limits of the defined claims of this patent.

One of the advantages of this system over other prior art lies in the fact that there are not limitations on the configurations of possible evaluation schemes 1000 that can be utilized by the system, specifically in terms of model architecture and judgement criteria. Additionally, advantage is realized in the ability to add new preconfigured evaluation schemes 1000 to the system, and advantage is realized by the ability of the user to select which one of the evaluation schemes to be actively utilized. The ability of the system to allow selection between different evaluations schemes within a collection of evaluation schemes 732 stored in memory 730 allows great flexibility for the user to choose an evaluation scheme 1000 that best aligns with their desires. The ability to obtain new preconfigured evaluation schemes 1000 from a separate configuration system 932, gives the user further flexibility to explore additional options. The possible evaluation schemes 1000 are not dependent on a single CNN model architecture or single set of judgment criteria 1011, which are limitations of prior art. Further, the ability to obtain new preconfigured evaluation schemes 1000 including pre-trained machine learning models 1020 from a separate configuration system 932 does not require the local monitoring apparatus 700 itself to be capable of training a machine learning model, which allows the monitoring apparatus 700 to use less costly hardware than would be necessary if it needed to store datasets and perform training.

I claim:

1. A monitoring system for a sleeping area of a human baby, comprising:

at least one processor;

at least one communication interface coupled to said at least one processor which enables said at least one processor to communicate with other elements selected from the group consisting of at least one external device and at least one component of said monitoring system;

at least one image sensor coupled to said at least one communication interface, wherein said at least one image sensor is controllable by said at least one processor, with said at least one image sensor being positioned such that said sleeping area is within said at least one image sensor's sensing range;

at least one sound transducer coupled to said at least one communication interface, wherein output of said at least one sound transducer is controllable by said at least one processor, whereby an audible sound may alert a user;

at least one memory coupled to said at least one processor, wherein said at least one memory has in its storage:

at least one evaluation scheme, which has been preconfigured by at least one separate system and transferred to said at least one memory of said monitoring system;

computer-executable instructions that when executed, cause said at least one processor to:

communicate with at least one user interface by means of said at least one communication interface;

obtain a plurality of images of said sleeping area from said at least one image sensor;

store said plurality of images;

identify at least one selected evaluation scheme, wherein said at least one selected evaluation scheme is selected from the group consisting of default selections and selections made by said user through said at least one user interface;

process said plurality of images utilizing said at least one selected evaluation scheme, thereby providing an analysis of said plurality of images;

determine a conclusion about said human baby's body position, based on said analysis;

enable an alarm when said conclusion does not indicate a safe body position of said human baby.

2. The system as claimed in claim 1, wherein said at least one separate system is a remotely located computerized system which is not physically incorporated as part of said monitoring system itself, yet generates said at least one evaluation scheme which is transferable by way of said at least one communication interface and stored within said at least one memory.

3. The system as claimed in claim 1, further comprising at least one auxiliary light emitter coupled to said at least one communication interface, wherein output of said at least one auxiliary light emitter is controllable by said at least one processor.

4. The system as claimed in claim 1, wherein a software application is executed on said at least one external device which communicates with said monitoring system by way of said at least one communication interface to provide a graphical user interface, whereby said user may designate said at least one selected evaluation scheme which is used to process said plurality of images.

5. The system as claimed in claim 1, wherein said at least one evaluation scheme includes at least one deep learning model which has been trained on a dataset of images.

6. The system as claimed in claim 5, wherein said at least one deep learning model is employed to identify at least one general orientation of said human baby's head, which yields at least one confidence level of said at least one general orientation for use to infer a generalized body position of said human baby.

7. The system as claimed in claim 5, wherein a plurality of clothing articles worn by said human baby incorporate at least one distinct visible design, wherein each of the aid at least one distinct visible designs is uniquely positioned on each of the said plurality of clothing articles in a region selected from the group consisting of front side and back side and left side and right side.

8. The system as claimed in claim 7, wherein said at least one deep learning model is employed to identify at least one general orientation of said plurality of clothing articles, which yields at least one confidence level of said at least one general orientation of said plurality of clothing articles for use to infer a generalized body position of said human baby.

9. A computerized method for monitoring a sleeping area of a human baby, comprising:

Communicating, by at least one communication interface between at least one processor and other elements selected from the group consisting of at least one external device and at least one internal component;

Controlling, by said at least one processor through said at least one communication interface, at least one image sensor, which is positioned such that said sleeping area is within said at least one image sensor's sensing range;

Controlling, by said at least one processor through said at least one communication interface, the output of at least one sound transducer, whereby an audible sound may alert a user;

Storing, in at least one memory coupled to said at least one processor, at least one evaluation scheme, which has been preconfigured by at least one separate system and transferred to said at least one memory;

Communicating, by said at least one processor through said at least one communication interface, with at least one user interface;

Obtaining, by said at least one processor through said at least one communication interface, a plurality of images of said sleeping area from said at least one image sensor;

Storing, in said at least one memory, said plurality of images;

Identifying, by said at least one processor, at least one selected evaluation scheme, wherein said at least one selected evaluation scheme is selected from the group consisting of default selections and selections made by said user through said at least one user interface;

Processing, by said at least one processor, said plurality of images utilizing said at least one selected evaluation scheme, thereby providing an analysis of said plurality of images;

Determining, by said at least one processor, a conclusion about said human baby's body position based on said analysis;

Enabling, by said at least one processor, an alarm when said conclusion does not indicate a safe body position of said human baby.

10. The method as claimed in claim 9, wherein storing, in at least one memory, said at least one evaluation schemes may be accomplished by transferring said at least one evaluation scheme, by way of said at least one communication interface, to said at least one memory, which evaluation scheme originates in said at least one separate system, which said at least one separate system is a remotely located computerized system which generates said at least one evaluation scheme.

11. The method as claimed in claim 9, wherein controlling at least one auxiliary light emitter, by said at least one processor through said at least one communication interface, enables variable amounts of illumination to be produced by said at least one auxiliary light emitter.

12. The method as claimed in claim 9, wherein communicating, by said at least one communication interface between said at least one processor and said at least one external device, provides a means for said user to access a graphical user interface, whereby said user may designate said at least one selected evaluation scheme which is used to process said plurality of images.

13. The method as claimed in claim 9, wherein processing, by said at least one processor, includes use of at least one deep learning model which has been trained on a dataset of images.

14. The method as claimed in claim 13, wherein processing, by said at least one processor, using said at least one deep learning model identifies at least one general orientation of said human baby's head, which yields at least one confidence level of said at least one general orientation for use to infer a generalized body position of said human baby.

15. The method as claimed in claim 13, wherein clothing said human baby makes use of a plurality of clothing articles worn by said human baby, wherein each said clothing article incorporates at least one distinct visible design, wherein each of the said at least one distinct visible designs is uniquely positioned on each of the said plurality of clothing articles in a region selected from the group consisting of front side and back side and left side and right side.

16. The method as claimed in claim 13, wherein processing, by said at least one processor, using said at least one deep learning model identifies at least one general orientation of said plurality of clothing articles, which yields at least one confidence level of said at least one general orientation of said plurality of clothing articles for use to infer a generalized body position of said human baby.

17. A non-transitory computer-readable storage medium, having computer executable instructions stored thereon that, when executed by at least one processor, cause the at least one processor to:

Communicate between said at least one processor and other elements selected from the group consisting of at least one external device and at least one internal component of the monitoring system;

Control at least one image sensor, which is positioned such that said sleeping area is within said at least one image sensor's sensing range;

Control the output of at least one sound transducer, whereby an audible sound may alert a user;

Store at least one evaluation scheme, which has been preconfigured by at least one separate system and transferred to said at least one memory;

Communicate with at least one user interface;

Obtain a plurality of images of said sleeping area from said at least one image sensor;

Store said plurality of images;

Identify at least one selected evaluation scheme, wherein said at least one selected evaluation scheme is selected from the group consisting of default selections and selections made by said user through said at least one user interface;

Process said plurality of images utilizing said at least one selected evaluation scheme, thereby providing an analysis of said plurality of images;

Determine a conclusion about said human baby's body position based on said analysis;

Enable an alarm when said conclusion does not indicate a safe body position of said human baby.

18. The non-transitory computer-readable storage medium of claim 17 wherein storing said at least one evaluation schemes may be accomplished by transferring said at least one evaluation scheme, by way of said at least one communication interface, to said at least one memory, which evaluation scheme originates in said at least one separate system, which said at least one separate system is a remotely located computerized system which generates said at least one evaluation scheme.

19. The non-transitory computer-readable storage medium of claim 17, wherein communicating by said at least one communication interface between said at least one processor and said at least one external device, provides a means for said user to access a graphical user interface, whereby said user may designate said at least one selected evaluation scheme which is used to process said plurality of images.

20. The non-transitory computer-readable storage medium of claim 17, wherein processing includes use of at least one deep learning model which has been trained on a dataset of images.

* * * * *